United States Patent [19]

Hill

[11] Patent Number: 4,892,651

[45] Date of Patent: Jan. 9, 1990

[54] FILTERING SYSTEM FOR FISH PONDS

[76] Inventor: Theodore L. Hill, 1506 Crestmont Dr., Harrisburg, Pa. 17112

[21] Appl. No.: 173,456

[22] Filed: Mar. 25, 1988

[51] Int. Cl.$^4$ .................................................. E04H 3/16
[52] U.S. Cl. ..................................... 210/151; 210/169; 210/170; 210/220; 210/264; 210/284; 210/286; 261/72.1; 119/3
[58] Field of Search ............... 210/150, 151, 169, 170, 210/220, 264, 266, 284, 286, 221.2; 261/124, 122, 72.1; 119/3, 5

[56] References Cited

U.S. PATENT DOCUMENTS

| | | | |
|---|---|---|---|
| 471,811 | 3/1892 | Deutsch | 210/150 |
| 695,399 | 3/1902 | Kinsey | 261/124 |
| 2,521,454 | 9/1950 | Dressler | 261/124 |
| 2,521,474 | 9/1950 | Morgan | 261/124 |
| 3,255,731 | 6/1966 | Girard | 119/3 |
| 3,276,698 | 10/1966 | Wood | 261/124 |
| 3,334,819 | 8/1967 | Olavson | 261/124 |
| 3,394,486 | 7/1968 | Morawetz | 119/5 |
| 3,396,950 | 8/1968 | Wood | 261/122 |
| 3,529,574 | 9/1970 | Kelley et al. | 119/5 |
| 3,540,593 | 11/1970 | Stewart | 210/169 |
| 3,658,035 | 4/1972 | Harris | 119/5 |
| 3,757,739 | 9/1973 | Whitener | 210/169 |
| 3,768,651 | 10/1973 | Streeter | 210/169 |
| 3,797,508 | 3/1974 | Jacobs | 210/169 |
| 3,878,097 | 4/1975 | Mochizuki et al. | 210/220 |
| 4,043,299 | 8/1977 | Birkbeck et al. | 210/169 |
| 4,048,072 | 9/1977 | McCullough | 261/122 |
| 4,067,809 | 2/1978 | Kato | 210/169 |
| 4,086,167 | 4/1978 | Tapola et al. | 210/150 |
| 4,093,546 | 6/1978 | Taborsky | 210/150 |
| 4,141,823 | 2/1979 | Smith et al. | 210/150 |
| 4,192,255 | 3/1980 | Willinger | 261/124 |
| 4,220,530 | 9/1980 | Gabriele | 210/169 |
| 4,268,387 | 5/1981 | Hall | 210/169 |
| 4,295,965 | 10/1981 | Koster | 210/169 |
| 4,379,750 | 4/1983 | Tiggelbeck | 261/122 |
| 4,428,893 | 1/1984 | Cummings, Jr. et al. | 261/122 |
| 4,479,876 | 10/1984 | Fuchs | 210/157 |
| 4,604,197 | 8/1986 | Louboutin et al. | 210/150 |
| 4,622,139 | 11/1986 | Brown | 210/170 |
| 4,657,672 | 4/1987 | Allen | 210/169 |
| 4,769,221 | 9/1988 | Marihart | 261/124 |
| 4,800,021 | 1/1989 | Desbos | 210/150 |

Primary Examiner—Richard V. Fisher
Assistant Examiner—Cynthia L. Nessler
Attorney, Agent, or Firm—Allan B. Osborne

[57] ABSTRACT

A filtering system for use with fish-containing ponds and bodies of water is disclosed. More particularly, the filtering system includes chambers for harboring microorganisms which clean organic waste from the water flowing therethrough from the pond. The chambers include by-pass conduits so that a given chamber may be taken out of service for cleaning without interrupting the flow of water through the rest of the system. Further, movable walls are provided so that several chambers contained in a single structure may be varied in number and in size according to a pond's requirements. Also included is an air manifold for use in supplying air to the micro-organisms.

9 Claims, 4 Drawing Sheets

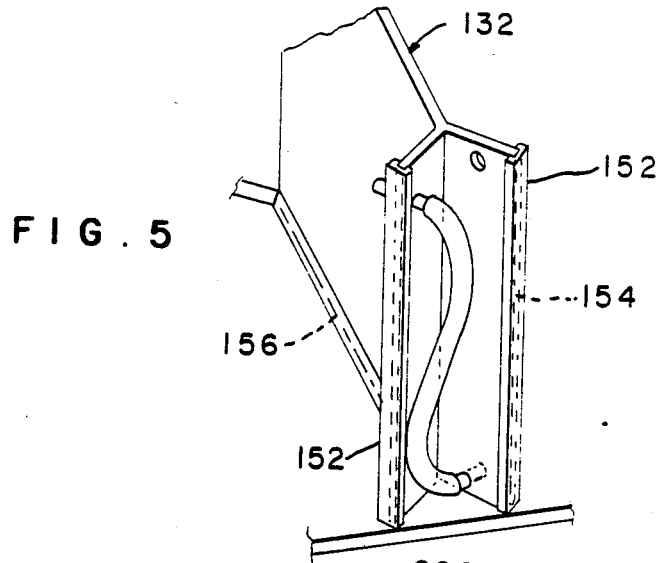
FIG. 5
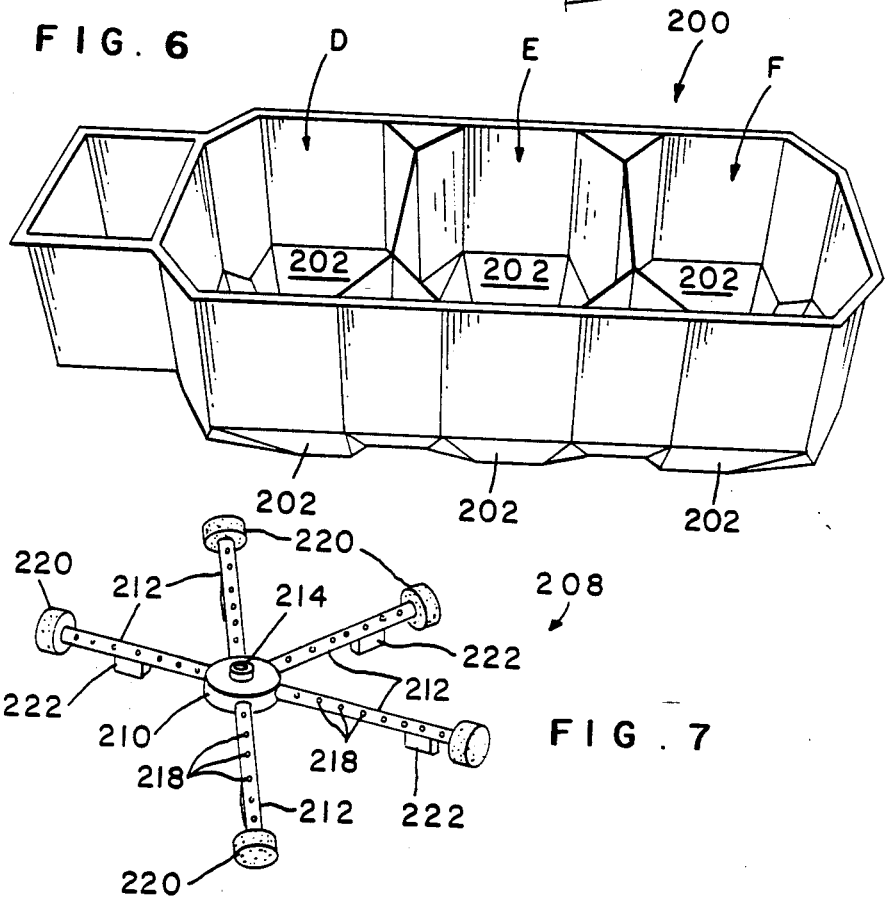
FIG. 6
FIG. 7

FILTERING SYSTEM FOR FISH PONDS

FIELD OF THE INVENTION

The invention disclosed herein relates to filtering systems for filtering the water in fish ponds.

BACKGROUND OF THE INVENTION

With the passage of time and continued introduction of labor-saving devices, man has found time to pursue interests not related to the mundane task of earning a livelihood. One such interest is the keeping of fish such as the well known goldfish and lesser known but more expensive, koi. As is well known however, the keeping and cultivating of fish is not without its problems. One such problem is that the man-made ponds in which the fish are kept require regular maintenance. More particularly, the water must be circulated continuously through a filtering system to remove dirt, debris and more importantly, fish waste.

Filtering systems currently in use employ one or more active filtering chambers containing a filtering media; e.g., gravel, marble chips, lava rock and mats of synthetic material. Water from the pond is pumped through the media which removes the solid matter. Further, the media supports beneficial micro-organisms; i.e., bacteria, which biologically removes undesirable material from the water and insures that ammonia and nitrite levels are maintained below toxic concentrations. In addition, it is common to employ a passive filtering settling basin in between the pond and filtering chamber to allow larger matter to settle so as not to clog the filtering media prematurely.

Whereas filtering systems as now in use are generally effective, they in turn must be cleaned on a regular basis which in some cases may be weekly. This means that the micro-organisms are repeatedly destroyed or worst, none gets established. Where more than one chamber is used, the time period between cleanings is lengthened, which permits more effective use of micro-organisms but the cleaning task becomes substantial.

Further, contemporary filtering systems having a plurality of chambers are formed as a single structure. Thus, an already installed system cannot be reduced or expanded readily nor economically.

Still another problem in contemporary filtering systems is that the micro-organisms either receive inadequate air through air stones randomly located or the bottom of the chambers or no air at all.

It is now proposed to provide a filtering system incorporating alternate flow paths so that a given chamber can be isolated and cleaned without disturbing nor interrupting the flow of water through the other chambers and the pond. It is further proposed to provide a filtering system wherein the number of chambers may be conveniently and readily reduced or increased in number and in size. It is still further proposed to provide an air manifold which may be positioned in the bottom of each chamber so that air is evenly distributed through the media harboring the micro-organisms.

SUMMARY OF THE INVENTION

According to the invention, a filtering system for fish ponds is provided which includes a plurality of biological chambers containing micro-organisms for scavenging organic waste matter from the water and bypass conduits whereby a selected chamber may be isolated for cleaning without interrupting the flow of water through the rest of the system. The invention further includes chambers, contained in a single structure, having movable intermediate walls whereby the chambers may be varied in number and size as required. The invention also includes an air manifold for positioning in the bottom of the chambers whereby air will pass up through the media uniformly.

The invention therefore comprises a filtering system for filtering the water in a man-made pond of the type containing fish with the system including means for defining a plurality of chambers including means for harboring micro-organisms for scavenging organic waste matter from the water entering the plurality of chambers from the pond, wherein said plurality of chambers are positioned in a single structure having end walls, side walls and a floor, said chamber defining means also including intermediate walls between, and common to, adjacent chambers, said intermediate walls including hollow enclosures devoid of water, inlet means for directing water from the pond to said single structure, outlet means for directing water from said single structure to the pond, first conduit means fluidly connecting each of said plurality of chambers and being disposed in each of said hollow enclosures and means for bypassing at least one chamber whereby the flow of water through the system may bypass at least one chamber. The hollow enclosures may be defined by dual axial angular extensions at each end of a vertical planar central portion of the intermediate walls cooperating with the side walls of the structure.

DESCRIPTION OF THE DRAWINGS

FIG. 5 is a perspective view of a movable intermediate wall for use in constructing several chambers in a single structure;

FIG. 6 is a perspective view of a multi-chamber unit having a reduced-area bases;

FIG. 7 shows an air manifold constructed in accordance with the present invention;

DESCRIPTION OF THE INVENTION

Figure 1:
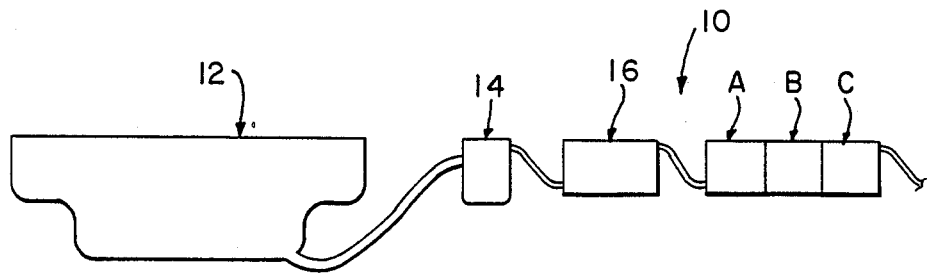
FIG. 1 is a diagrammatical drawing of a typical filtering system for a fish pond.

FIG. 1 is a diagrammatical drawing of a typical filtering system 10 for fish pond 12. System 10 may include either a vortex unit 14 or a settling basin 16 or both. These two components mechanically clean the incoming water from pond 12 of non-organic debris; e.g., leaves and small stones. System 10 also includes one or more biological chambers, for example, chambers A, B, and C. These chambers A-C contain biological support media (not shown) on which micro-organisms can attach and grow. As is well known, the micro-organisms or bacteria feed on undesirable organic material in the water; e.g., algae. Such media include a man-made matting and naturally occurring material such as zeolite, canterbury spar and some kinds of lava rock.

As is well known, a pump (not shown), is required to move the water through system 10. The location of the pump is dictated by consideration not of importance here and details thereof are omitted. Generally, however, the pump is located between pond 12 and the first unit, e.g., unit 14.

Water from pond 12 first moves through the mechanical cleaning units 14, 16 and then through the biological Chambers A, B, C.

Figure 2:
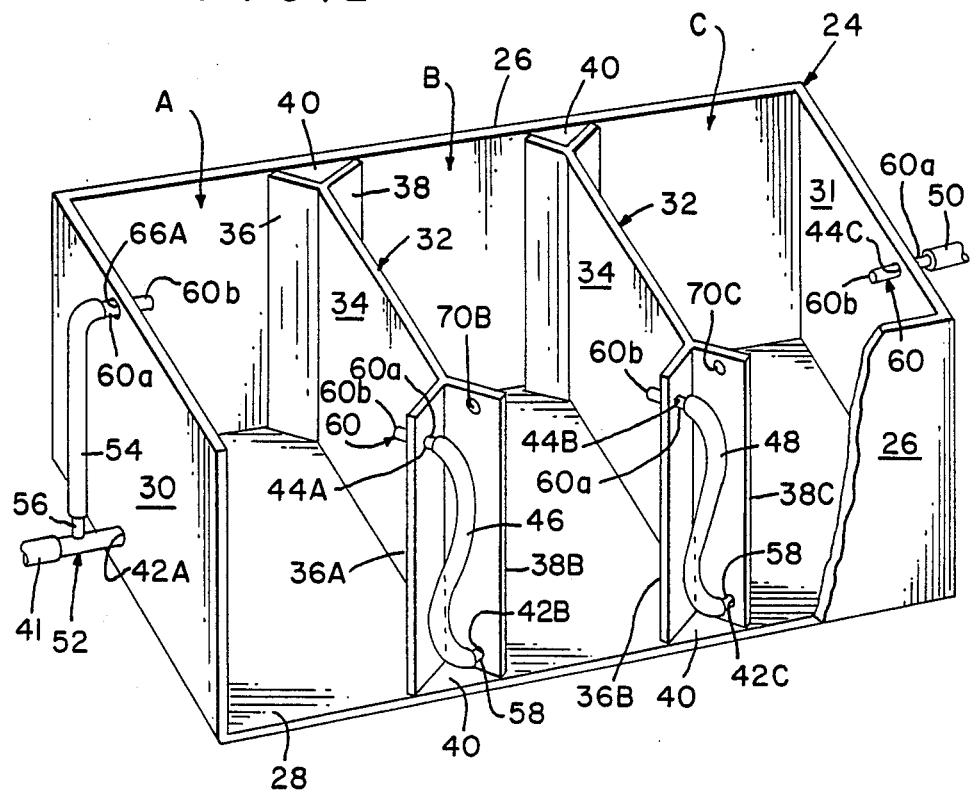
FIG. 2 is a cut-away, perspective view of several biological filtering chambers of the present invention.

With reference to FIG. 2, chambers A-C are shown within structure 24. Side walls 26, floor 28, end walls 30, 31 and intermediate walls 32 define chambers A-C. Intermediate walls 32 include an elongated center section 34 and at each end thereof a pair of panels 36, 38. As indicated in the drawings, a capital letter A, B or C is added to the panel's reference numeral to show the panel's association with a given chamber A-C. Panels 36, 38 are at about a forty five degree angle relative to the plane of center section 34 and accordingly are about ninety degrees apart from each other to define space 40 therebetween.

Water from pond 12, unit 14 or unit 16 as the case may be, flows through conduit 41 into chamber A through inlet port 42A located in the lower portion of end wall 30; i.e., near floor 28 of structure 24. The water rises up through the media (not shown) and flows out through outlet port 44A located in the upper portion of panel 36A. From port 44A, the water flows down through conduit 46 located in space 40 and into inlet port 42B located in the lower portion of panel 38B which forms a wall of chamber B. The water flows upwardly through the media (not shown) in chamber B and through outlet port 44B, into conduit 48 in space 40 and then into inlet port 42C of chamber C. The water flows upwardly in chamber C and out through outlet port 44C in end wall 31 to return to pond 12 via conduit 50.

Port 42A is provided with "T"-shaped fitting 52 with one end receiving conduit 41 and conduit 54 attached to tee 56. Ports 42B and C are provided with pipe 58 projecting out into space 40 but not into chambers B, C respectively. Ports 44 A, B and C are provided with pipes 60 with ends 60a projecting out into space 40 (ports 44A, B), outside structure 24 through end wall 31 (port 44C) and with ends 60b projecting into chambers A, B, C.

Figure 3:
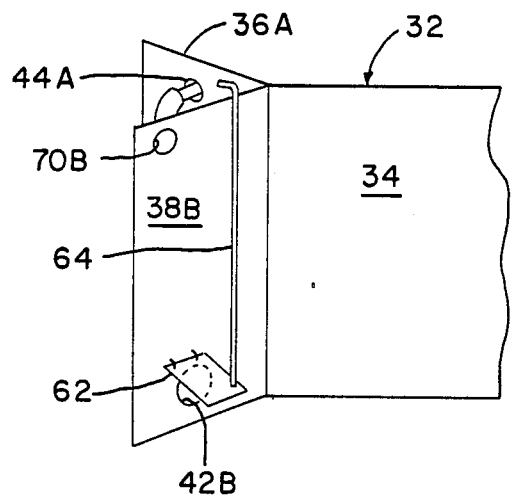
FIG. 3 is a perspective view of a portion of an intermediate wall showing a gate for shutting off the flow of water into a chamber.

Ports 42 A, B and C are provided with gates 62 on the inside of chambers A, B, C. As shown in FIG. 3, gates 62 are hinged over the ports 42 and are moved against and away therefrom by levers 64 extending upwardly to adjacent the top of the respective chambers A, B, C. Levers 64 may be secured by any one of several known means to keep gates 62 stationary in the selected position.

Ports 42 and 44, fitting 52, pipes 58, 60 and conduits 41, 46, 48 and 50 provide the flow paths for water passing through chambers A, B, C. Additional ports 66A, 70B, pipes 60, and conduit 74 provide the means to by-pass a given chamber A, B, C so that it can be cleaned without interrupting the flow of water through the rest of system 10. Port 66A provided with pipe 60, is located near the top edge of end wall 30 and is connected to conduit 54. Port 70B is located near the top edge of panel 38B of chamber B and port 70C is located near the top edge of panel 38C of chamber C. Flexible conduit 74 (FIG. 4) is used to by-pass a given chamber A, B, C in cooperation with one or more of the ports as will now be explained.

Figure 4:
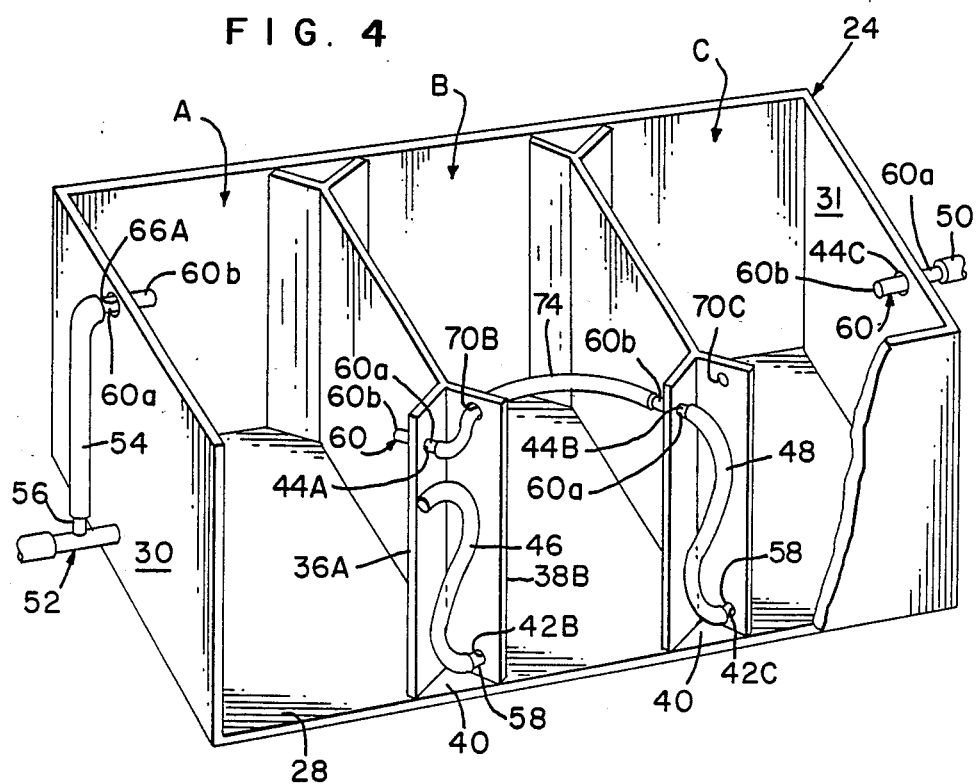
FIG. 4 is the cut-away view of FIG. 2 showing a chamber being by-passed.

With reference to the diagrammatic drawing of FIG. 4, a given chamber; e.g., chamber B, is isolated or by-passed by first temporarily stopping the flow of water from pond 12. Conduit 46 is removed from pipe end 60a in port 44A and port 42B is closed off with the gate 62 (not shown) associated therewith.

Conduit 74 is placed in chamber B and one end is passed through port 70B in panel 38B and attached to pipe end 60a in port 44A. The other end of conduit 74 is attached to pipe end 60b in port 44B. System 10 is restarted and the flow of water goes directly from chamber A to chamber C through by-pass conduit 74 and conduit 48. Chamber B is now ready to be cleaned. Returning chamber B to service requires temporarily shutting off the flow of water while conduit 74 is removed, conduit 46 is reattached to pipe end 60a in port 44A and reopening inlet port 42B in chamber B.

Chamber A may be by-passed by attaching conduit 74 to pipe end 60b in ports 66A and 44A, both within chamber A and shutting off inlet port 42A.

Chamber C may be by-passed by replacing conduit 48 on pipe end 60a in port 44B with one end of conduit 74, passing conduit 74 through port 70C in panel 38C of chamber C and attaching the other end to pipe end 60b in port 44C. Inlet port 42C is closed by gate 62 associated therewith.

Structure 24 may be fabricated with intermediate walls 32 as an integral and permanent part thereof. Alternatively, intermediate walls 32 may be separate components thereof as shown in FIG. 5 and indicated therein as reference numeral 132. Gasket 152 located along the side and bottom edges 154, 156 respectively seals off adjacent chambers. The advantage of having movable intermediate walls 132 is that chambers A-C may be varied in size as desired.

FIG. 6 shows a unit 200 in which chambers D, E and F have walls 202 which slope inwardly to floor 204 (FIG. 8) so that base 206 (FIG. 8) is reduced in area relative to the opposite open end.

Figure 8:
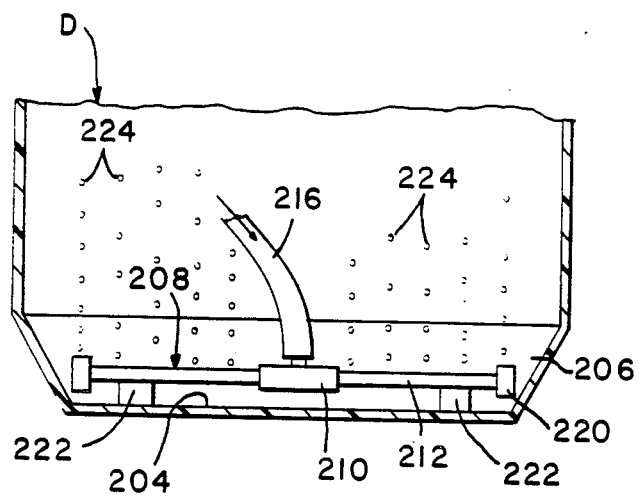
FIG. 8 is a view showing the manifold of FIG. 7 positioned in a chamber.
Figure 9:
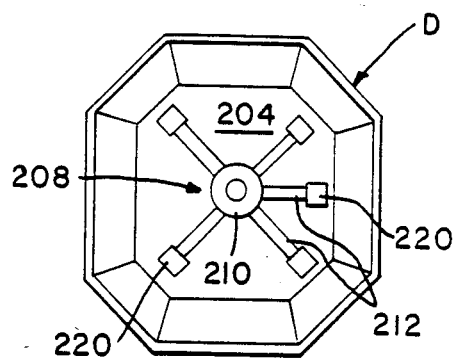
FIG. 9 is a top plan view of the manifold in a chamber.

FIG. 7 shows air manifold 208 which may be positioned in a chamber; e.g., chamber D as shown in FIGS. 8, 9, so that air may be distributed uniformly up through the media (not shown) for the benefit of the micro-organisms (not shown) growing therein. Manifold 208 includes center section 210 which is hollow and a plurality of hollow arms 212 attached to and extending outwardly from center section 210. As shown, arms 212 are not necessarily spaced evenly around section 210 as a space may be required to receive a discharge pipe (not shown) Nipple 214, projecting upwardly from center section 210, receives thereon tube 216 (FIG. 8) coming from an air source (not shown) outside the chamber. Each arm 212 is preferably perforated along the length thereof as indicated by reference numeral 218. Further air stones 220 may be attached to the free ends of arms 212 as shown. Blocks 222 may be attached to the undersides of each arm 212 near the free ends to position manifold 208 off floor 204.

As shown in FIG. 8, air coming into manifold 208 through tube 216 leaves arms 212 through perforations 218 and air stones 220 and bubbles up through the media (not shown), as indicated by reference numeral 224, to supply oxygen to the micro-organisms (not shown). The location of manifold 208 and the inherent tendency not to move around insures uniform distribution of air through the media.

FIG. 9 is a view looking down on manifold 208 on floor 204 of chamber D.

Figure 10:
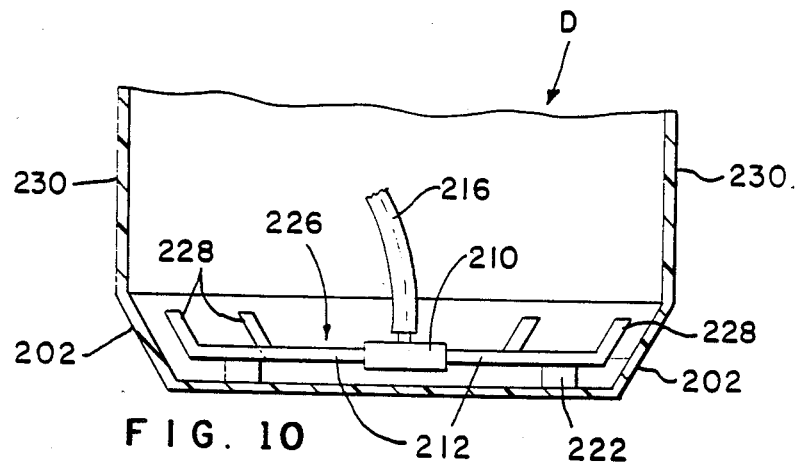
FIG. 10 is a view of another embodiment of the manifold.

Manifold 22 shown in FIG. 10 has been modified by the free ends 228 of arms 212 turning up obliquely so that they extend into the area of chamber D over sloping walls 202. Accordingly, air leaving arms 212 will bubble up through the media (not shown) adjacent sides 230 of chamber D. Air stones (not shown) may be attached to arms 212 if desired or the end faces (not shown) may be perforated.

As can be discerned, a filtering system for fish ponds has been disclosed. The system includes mechanical units and biological chambers through which the water from the pond flows to remove both inorganic debris and organic waste. The biological chambers may be separate units or housed in a single structure. Separate openings are provided in each chamber so that a given chamber may be isolated and cleaned without disturbing the flow of water through the other units and chambers. Further, movable, intermediate walls are provided for chambers housed in a single structure so that the chamber sizes may be tailored to meet specific requirements. Further disclosed is a manifold for uniformly distributing air through the media in the chambers.

I claim:

1. A filtering system for filtering the water in a man-made pond of the type containing fish, said system comprising:
    means for defining a plurality of chambers with at least one of said chambers having micro-organisms for scavenging organic waste matter from the water entering said chambers from the pond, said means being a single structure having end walls, side walls, a floor and including intermediate walls between and defining adjacent chambers, said intermediate walls including hollow enclosures devoid of water;
    inlet means attached to and extending between said single structure and the pond for directing water from the pond to said single structure;
    outlet means for directing water from said single structure to the pond;
    first conduit means fluidly connecting each of said plurality of chambers, said first conduit means being disposed in each of said hollow enclosures; and
    second conduit means for being selectively integrated into said first conduit means whereby the flow of water through the system may bypass at least one chamber.

2. The filtering system of claim 1 further including gate means to regulate the flow of water into each of said chambers.

3. The filtering system according to claim 1 further including an air manifold for use in said chambers, said manifold comprising;
    a hollow center section having a nipple for receiving an air supply tube;
    a plurality of hollow arms, attached to said center section and extending outwardly therefrom, said arms being provided with air release means for permitting air to leave said arms and bubble up through the media; and support means for supporting said arms and center section off a floor of the chamber.

4. The air manifold of claim 3 wherein said air release means include air stones attached to said arms.

5. The air manifold of claim 3 wherein said air release means include perforations along the length of said arms.

6. The air manifold of claim 3 wherein said arms include free ends which are positioned at an angle relative to said arms.

7. A filtering system for filtering the water in a man-made pond of the type containing fish, said system comprising:
    means for defining a plurality of chambers including means for harboring micro-organisms for scavenging organic waste matter from the water entering said plurality of chambers from the pond, said plurality of chambers being positioned in and part of a single structure having end walls, side walls and a floor, said chamber defining means also including intermediate walls between and common to adjacent chambers, said intermediate walls including hollow enclosures devoid of water;
    inlet means for directing water from the pond to said single structure;
    outlet means for directing water from said single structure to the pond;
    first conduit means fluidly connecting each of said plurality of chambers, said first conduit means being disposed in each of said hollow enclosures; and
    means for bypassing at least one chamber whereby the flow of water through said system may bypass at least one chamber.

8. The filtering system according to claim 7 wherein said intermediate walls include a vertical planar central portion and dual axial angular extensions at each end with said hollow enclosures being defined by said dual axial angular extensions cooperating with said side walls.

9. The filtering system for filtering water from a body of water of the type containing fish, said system comprising:
    a vessel containing a plurality of spaced apart walls defining first and second chambers, said walls including side walls, end walls, a floor and an intermediate wall between and common to said chambers, said intermediate wall having at least one hollow enclosure devoid of water;
    filtering means in a first chamber for filtering particulate matter from water entering said vessel from the body of water;
    biological support means in a second chamber for supporting micro-organisms for scavenging organic waste matter from water entering said second chamber from said first chamber;
    inlet means for directing water from the body of water to said first chamber;
    outlet means for directing water to the body of water from said second chamber;
    first conduit means fluidly connecting said first and second chambers and disposed in said at least one hollow enclosure; and
    second conduit means integrated into said first conduit means for diverting the water to permit the selective bypassing of either the first or the second chamber.

* * * * *